United States Patent [19]

Poliniak

[11] Patent Number: 4,486,325

[45] Date of Patent: Dec. 4, 1984

[54] HIGH-DENSITY INFORMATION DISC LUBRICANTS

[75] Inventor: Eugene S. Poliniak, Willingboro, N.J.

[73] Assignee: RCA Corporation, New York, N.Y.

[21] Appl. No.: 595,530

[22] Filed: Mar. 30, 1984

[51] Int. Cl.$^3$ .............................. C10M 1/10; B32B 3/02
[52] U.S. Cl. .................................... 252/49.6; 428/64; 428/65; 428/447; 264/107; 369/276
[58] Field of Search ............... 252/49.6; 428/64, 65, 428/447; 264/107; 369/276

[56] References Cited

U.S. PATENT DOCUMENTS

| | | | |
|---|---|---|---|
| 4,275,101 | 6/1981 | Wang et al. | 369/286 |
| 4,327,140 | 4/1982 | Preston | 428/65 |
| 4,330,583 | 5/1982 | Datta et al. | 428/65 |
| 4,346,468 | 8/1982 | Preston et al. | 369/276 |
| 4,346,469 | 8/1982 | Hillenbrand et al. | 369/276 |
| 4,351,048 | 9/1982 | Berry | 369/288 |
| 4,355,062 | 10/1982 | Wang et al. | 428/64 |
| 4,383,961 | 5/1983 | Nyman et al. | 264/107 |

Primary Examiner—John F. Niebling
Attorney, Agent, or Firm—Birgit E. Morris

[57] ABSTRACT

Chlorophenyl trialkoxysilane, when added to a fractionated methyl alkyl siloxane lubricant for capacitive electronic discs, improves the playback performance and surface quality of the discs.

6 Claims, No Drawings

HIGH-DENSITY INFORMATION DISC LUBRICANTS

This invention relates to a lubricant additive for high-density information discs. More particularly this invention relates to a lubricant additive that improves the playback performance of high-density information discs.

BACKGROUND OF THE INVENTION

U.S. Pat. No. 4,275,101 discloses a fractionated and purified methyl alkyl siloxane useful as a lubricant for a high-density information disc. This lubricant has the formula

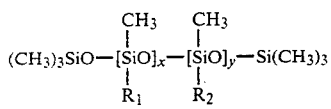

wherein $R_1$ and $R_2$ are alkyl groups of 4–20 carbon atoms, x is an integer of 2–4, y is an integer of 0–2 and wherein the sum of x and y is 4 or less. This material can be purified by molecular distillation between 100°–205° C. The lubricant acts to reduce friction between the disc and a playback stylus and to improve the life of the disc. However, the discs are sensitive to moisture and on playback are subject to a phenomenon dubbed "carrier distress" which interferes with playback.

One way that has been found to reduce carrier distress is to wash the surface of the discs after molding to remove the surface salts and stains that form on the disc surface during the molding process. These salts are water-soluble and thus form non-homogeneous salt deposits after exposure to high relative humidity. Of course this cleaning process requires an additional step during manufacture.

In an effort to reduce the carrier distress, lubricant additives have also been tried. U.S. Pat. No. 4,355,062 discloses bis(hydroxyalkyl)disiloxanes useful as additives for the methyl alkyl siloxane lubricants which reduces carrier distress, particularly after high-temperature, high-relative-humidity stressing. A preferred dopant has the formula

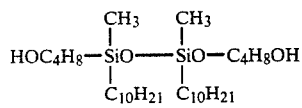

While very effective this additive is also very expensive.

Other lubricant additives are known for the methyl ethyl siloxane lubricants; however, some of them, such as hydroxylated amines disclosed in U.S. Pat. No. 4,330,583, have the disadvantage that the additives are not soluble in the lubricant and thus must be applied to the surface of the disc from separate solutions. Other known additives are insoluble, or not commercially available, or have other drawbacks.

In addition to the phenomenon known as carrier distress, other defects in the records cause skips during playback which is apparent to the viewer as blackouts, chatter and the like and thus are very annoying. The skips are probably due to the presence of dust particles or other debris that settles on the lubricated disc surface, adhering to the surface and causing the playback stylus to lift out of the information track. Thus the search for suitable lubricant additives has continued to find a lubricant additive that can provide both good carrier-distress performance and reduced skips.

SUMMARY OF THE INVENTION

I have found that chlorophenyl alkoxysilanes can be added to methyl alkyl siloxane lubricants for high-density information discs to provide improved playback performance for the discs.

DETAILED DESCRIPTION OF THE INVENTION

The chlorophenyl alkoxysilanes useful in the invention have the general formula

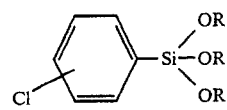

wherein R at each occurrence can be H or alkyl of 1–3 carbon atoms. Preferably, the silane should be soluble or miscible in the methyl alkyl siloxane lubricant. For example, para-(chloromethyl)phenyl trimethoxy silane, a material close structurally to those of the present invention, is insoluble in the methyl alkyl siloxane lubricant and thus is not suitable.

The chlorophenyl alkoxysilane additives can be added to the methyl alkyl siloxane lubricant alone, or in combination with known dopants. For example, as the data supplied hereinafter will show, although skips performances improved with the addition of the chlorophenyl alkoxysilane alone to either as-pressed or rinsed discs, the carrier-distress performance is not as good in all cases as known additives. Thus a combination of additives can be employed to combine features of both additives and obtain improved carrier-distress and skip performance, both for as-pressed and rinsed discs.

The amount of the chlorophenyl alkoxysilane additives to be used with the lubricant can vary within a wide range and is not believed to be critical. The amount to be added depends somewhat on whether other additives will be present, and which ones. However, one skilled in the art, by performing routine tests of carrier-distress and skips performance, can readily determine the optimum concentration of additives for each combination of lubricant and additives. The lubricant and additives can be applied to the disc by fogging or spraying directly, or by spraying from a solution in a solvent such as heptane or heptane-isopropanol mixtures.

The invention will be further illustrated by the following Examples, but the invention is not meant to be limited to the details described therein. In the Examples, parts and percentages are by weight unless otherwise noted.

Carrier distress time is measured by adding the amount of time in seconds (but discounting intervals of less than 10 microseconds) during record playback when the r.f. output of the player arm is less than 150 millivolts peak to peak and the time when the r.f. output gives above 8.6 or below 3.1 megahertz in frequency, indicating a defect. Such defects are noted by the viewer as dropouts. The present acceptable level of carrier distress for a video record is three seconds in one hour of playback time.

Another test of the disc is known as the small skips test. The r.f. output of the player arm normally detects eight consecutively numbered daxi codes for each rotation of the disc. Thus if less than eight daxi codes are noted per rotation, a computer attached to the player determines the number of daxi codes missed and then computes the number of grooves skipped. The number of times during one hour of playback that eight grooves or less are skipped (one small skip event) is monitored. The present acceptable level of small skip events is 30 per one hour of playback.

EXAMPLE 1

A group of capacitance electronic discs as pressed from the mold were lubricated by spraying with a 0.3 percent solution of methyl decyl siloxane molecularly distilled at 100°–205° C. in heptane containing 15 and 25 percent, respectively, of an additive having the formula

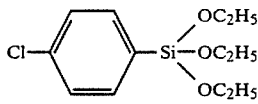

The discs were played once, stressed by storing in a chamber at 100° F. and 95 percent relative humidity for one hour, and played again. The stress test was repeated once. The data are given below in Table I wherein the control is a commercially employed mixture of purified, fractionated methyl decyl siloxane and bis(hydroxybutyl)-disiloxane in an amount of 0.03 percent of the lubricant mixture.

TABLE I

| Sample | Carrier Distress, secs./hour of play | | | | | | | | |
|---|---|---|---|---|---|---|---|---|---|
| | Initial Play | | | After 1st Stress | | | After 2nd Stress | | |
| | Median | Range | # Pass | Median | Range | # Pass | Median | Range | # Pass |
| Example 1 (15%) | 0.2 | 0.1–1.0 | 12/12 | 29 | 8.5–65 | 0/12 | 2.1 | 0.3–18 | 7/12 |
| Example 1 (25%) | 0.2 | 0.1–0.4 | 12/12 | 25 | 5–162 | 0/12 | 2.9 | 0.1–27 | 6/12 |
| Control 1 | 0.3 | 0.1–19 | 11/12 | 0.3 Skips | 0.1–2.9 | 12/12 | 0.2 | 0.1–1.2 | 12/12 |
| Example 1 (15%) | 18 | 0–482 | 7/12 | 8 | 0–304 | 10/12 | 8 | 0–7140 | 10/12 |
| Example 1 (25%) | 4 | 0–196 | 9/12 | 8 | 0–172 | 9/12 | 2 | 0–16 | 12/12 |
| Control 1 | 34 | 0–160 | 6/12 | 17 | 4–924 | 8/12 | 16 | 2–152 | 7/12 |

EXAMPLE 2

The procedure of Example 1 was followed except that the discs were first cleaned by rinsing in a 5 percent aqueous solution of Shipley developer from the Shipley Company of the formula

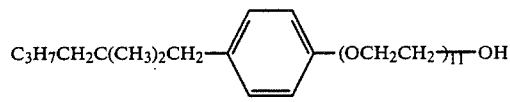

and dried in 1,1,2-trichloro-2,2,1-trifluoroethane prior to being lubricated. The data are summarized below in Table II.

TABLE II

| Sample | Carrier Distress, secs./hour of play | | | | | | | | |
|---|---|---|---|---|---|---|---|---|---|
| | Initial Play | | | After 1st Stress | | | After 2nd Stress | | |
| | Median | Range | # Pass | Median | Range | # Pass | Median | Range | # Pass |
| Example 2 (15%) | 0.4 | 0.2–1.1 | 12/12 | 0.3 | 0.2–1.5 | 12/12 | 0.4 | 0.1–9.5 | 11/12 |
| Example 2 (25%) | 0.6 | 0.3–0.9 | 12/12 | 0.6 | 0.3–1.8 | 12/12 | 0.6 | 0.3–2.3 | 12/12 |
| Control 2 | 0.5 | 0.3–27 | 11/12 | 0.6 Skips | 0.4–5.0 | 11/12 | 0.6 | 0.3–15 | 11/12 |
| Example 2 (15%) | 24 | 0–110 | 9/12 | 11 | 0–54 | 11/12 | 5 | 0–26 | 12/12 |
| Example 2 (25%) | 48 | 4–140 | 4/12 | 48 | 8–3082 | 5/12 | 18 | 2–90 | 7/12 |
| Control 2 | 40 | 14–200 | 5/12 | 34 | 8–304 | 5/12 | 38 | 14–386 | 4/12 |

A review of the above data shows that best results for both carrier distress and skips are obtained using washed and dried discs as in Example 2 at a lower concentration of the additive of the invention.

EXAMPLE 3

The procedure of Example 1 was followed except that the lubricant solution contained, in addition to methyl decyl disiloxane and chlorophenyl triethoxysilane, 0.3 percent by weight of the siloxane of bis(hydroxybutyl)disiloxane. The data are given below in Table III.

TABLE III

| Sample | Carrier Distress, secs./hour of play | | | | | | | | |
|---|---|---|---|---|---|---|---|---|---|
| | Initial Play | | | After 1st Stress | | | After 2nd Stress | | |
| | Median | Range | # Pass | Median | Range | # Pass | Median | Range | # Pass |
| Example 3 (15%) | 0.2 | 0.1–31 | 10/12 | 0.4 | 0.2–14 | 9/12 | 0.2 | 0.1–6.0 | 11/12 |
| Example 3 (25%) | 0.2 | 0.1–1.2 | 12/12 | 0.3 | 0.2–4.2 | 11/12 | 0.2 | 0.1–4.6 | 11/12 |
| Control 3 | 0.3 | 0.1–19 | 11/12 | 0.3 Skips | 0.1–2.9 | 12/12 | 0.2 | 0.1–1.2 | 12/12 |
| Example 3 (15%) | 10 | 0–232 | 9/12 | 12 | 0–502 | 9/12 | 4 | 0–222 | 11/12 |
| Example 3 (25%) | 10 | 0–318 | 9/12 | 6 | 0–1332 | 9/12 | 0 | 0–84 | 11/12 |
| Control 3 | 34 | 0–160 | 6/12 | 17 | 4–924 | 8/12 | 16 | 2–152 | 7/12 |

EXAMPLE 4

The procedure of Example 2 was followed except that the lubricant solution contained, in addition to methyl decyl siloxane and chlorophenyl triethyoxysilane, 0.03 percent by weight of the siloxane of bis(hydroxybutyl)disiloxane. The data are given below in Table IV, wherein it can be seen that best overall performance is obtained at a higher level of concentration of the additive of the invention.

TABLE IV

| | Carrier Distress, secs./hour of play | | | | | | | | |
|---|---|---|---|---|---|---|---|---|---|
| | Initial Play | | | After 1st Stress | | | After 2nd Stress | | |
| Sample | Median | Range | # Pass | Median | Range | # Pass | Median | Range | # Pass |
| Example 4 (15%) | 0.4 | 0.3–3.6 | 11/12 | 0.5 | 0.2–4.0 | 9/12 | 0.4 | 0.2–0.8 | 12/12 |
| Example 4 (25%) | 0.3 | 0.2–0.6 | 12/12 | 0.3 | 0.2–0.5 | 12/12 | 0.2 | 0.2–0.5 | 12/12 |
| Control 4 | 0.5 | 0.3–27 | 11/12 | 0.6 Skips | 0.4–5.0 | 11/12 | 0.6 | 0.3–15 | 11/12 |
| Example 4 (15%) | 54 | 10–142 | 5/12 | 34 | 8–7568 | 3/12 | 25 | 2–308 | 9/12 |
| Example 4 (25%) | 20 | 8–82 | 7/12 | 9 | 2–176 | 11/12 | 5 | 0–72 | 10/12 |
| Control 4 | 40 | 14–200 | 5/12 | 34 | 8–304 | 5/12 | 38 | 14–386 | 4/12 |

I claim:

1. In a capacitive electronic disc having a lubricant coating thereon, the improvement wherein said lubricant includes an effective amount of a chlorophenyl trialkoxysiloxane as a dopant.

2. A disc according to claim 1 wherein said dopant is p-chlorophenyl triethoxysilane.

3. A disc according to claim 2 wherein said lubricant is methyl decyl siloxane which has been molecularly distilled at between 100°–205° C.

4. A disc according to claim 3 wherein said chlorophenyl trialkoxysiloxane is soluble in said methyl decyl siloxane.

5. A disc according to claim 3 wherein the lubricant additionally contains a bis(hydroxyalkyl)disiloxane dopant.

6. A disc according to claim 5 wherein the dopant is bis(hydroxybutyl)disiloxane.

* * * * *